H. T. Moody,
Wood Auger.
N° 55,144.   Patented May 29, 1866.
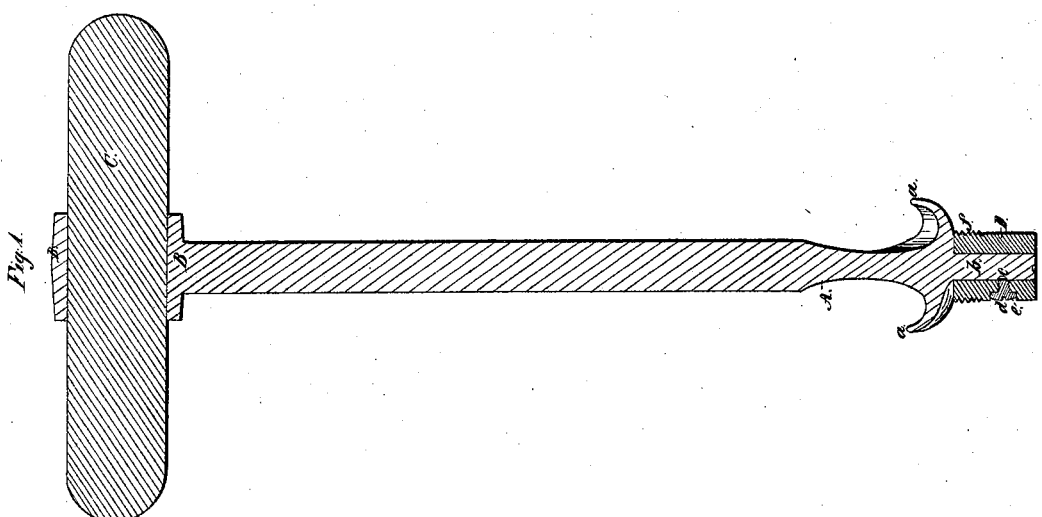
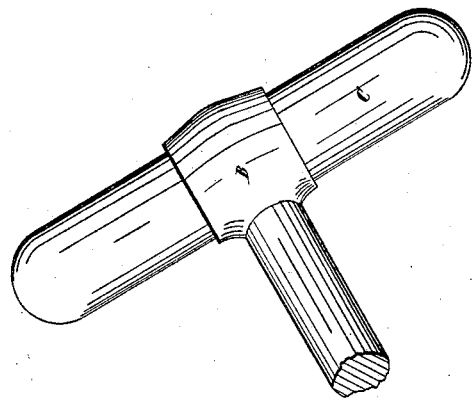
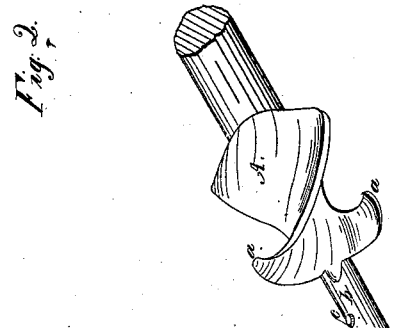
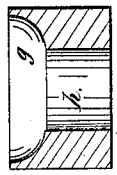
Witnesses:
Abbie M. Greenleaf
A. M. Greenleaf
Inventor:
H. T. Moody

UNITED STATES PATENT OFFICE.

HENRY T. MOODY, OF NEWBURYPORT, MASSACHUSETTS.

IMPROVEMENT IN AUGERS.

Specification forming part of Letters Patent No. 55,144, dated May 29, 1866.

*To all whom it may concern:*

Be it known that I, HENRY T. MOODY, of Newburyport, in the county of Essex and State of Massachusetts, have invented a new and useful Improvement in Augers for Countersinking Holes, of which the following is a full, clear, and exact description, reference being had to the accompanying drawings, making part of this specification, in which—

Figure 1 is a central longitudinal section through an auger with my improvement applied thereto. Fig. 2 is a view of the auger detached. Fig. 3 is a view of my improvement detached; Fig. 4, detail to be referred to.

It is the ordinary practice in ship-building to enlarge or countersink the outer end of each hole bored for the reception of a bolt, in order that after it is driven home it may be covered with a wooden plug fitting into the countersunk portion of the hole, thus preventing rust from collecting on the outside and giving the work a neat and finished appearance. For this purpose an auger has been used with its lower end so formed that it may enter the hole and serve as a center for the countersinking-tool; but this required a different tool for each size of bolt-hole.

To provide a tool that will form a countersink around any hole, irrespective of its diameter, and to perform the operation in a convenient and expeditious manner, is the object of my invention, which consists in an auger having its lower end so formed as to receive cylindrical plugs of different diameters, in order that the same tool may be used in bolt-holes of different diameters.

To enable others skilled in the art to understand and use my invention, I will now describe the manner in which I have carried it out.

In the said drawings, A is a bit or auger of the form seen in Fig. 2, and is provided with two cutting-edges, $a$. The upper end of the shank of this auger is provided with an eye, B, for the reception of the handle C, by which the auger is turned. The lower end, $b$, of the shank below the cutting-edges $a$ of the auger is turned down smaller than the diameter of the main or upper portion of the shank, and is provided with a hole, $c$, for the reception of the end of a screw, $d$, which passes through a hole, $e$, formed in a cylindrical metallic plug, D, which fits upon the lower end, $b$, of the shank, and by means of which the plug may be readily secured thereto.

$f$ is a screw-thread formed upon a portion of the outer surface of the plug D, (see Figs. 1 and 3,) for the purpose of drawing in and feeding forward the cutting-edges $a$ of the auger in the operation of enlarging or countersinking the outer end, $g$, of the hole $h$. (See Fig. 4.)

Operation: Any suitable tool being employed to bore the hole $h$ of a diameter corresponding to that of the bolt to be placed therein, a cylindrical plug, D, of the same size of the hole $h$, is slipped upon the end $b$ of the shank of my improved auger, and securely fastened thereto by clamping the screw $d$, when the lower end of the plug D is placed into the hole, and the handle C of the auger is turned so as to cause the screw-thread $f$ to draw the cutting-edges $a$ of the auger into the wood and form a countersink or enlargement at its outer end, $g$. (See Fig. 4.) After the bolt is entered and driven home a plug of wood of the form of the countersunk portion of the hole is fitted therein, thus giving the work a smooth and finished appearance.

When the tool is to be used for a hole of a different diameter the plug D may be removed by loosening the screw $d$ and another plug substituted of a size corresponding to the hole, the countersunk portion of which is then formed of the same size as before, as it affords sufficient space for the reception of the ends of bolts of various sizes.

The screw-thread $f$ may be dispensed with without departing from the spirit of my invention; but I prefer to use it, as it assists in drawing in and feeding forward the auger.

What I claim as my invention, and desire to secure by Letters Patent, is—

The removable centering-plug D, in combination with the bit or auger A, for the purpose set forth.

HENRY T. MOODY.

Witnesses:
ABBIE M. GREENLEAF,
A. W. GREENLEAF.